April 24, 1956

C. H. BELLAMY 2,742,952

MOVABLE SEAT

Filed May 12, 1953

3 Sheets-Sheet 1

INVENTOR
CLYDE H. BELLAMY

BY

ATTORNEY

April 24, 1956   C. H. BELLAMY   2,742,952
MOVABLE SEAT
Filed May 12, 1953   3 Sheets-Sheet 2
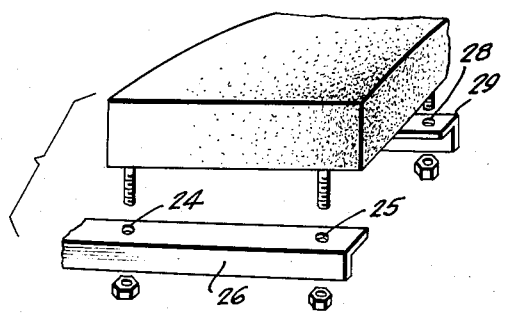
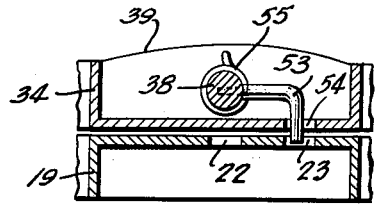
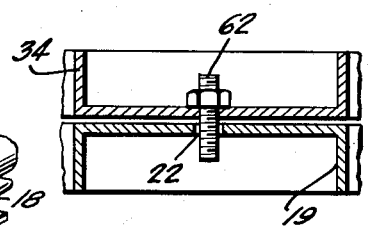
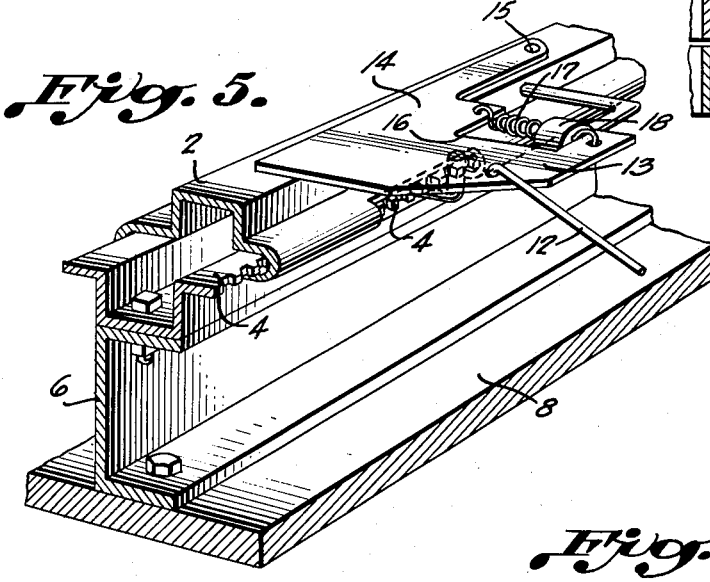
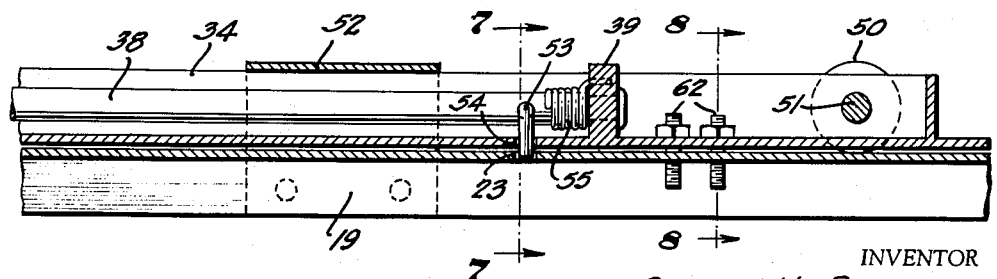
INVENTOR
CLYDE H. BELLAMY
BY
ATTORNEY April 24, 1956

C. H. BELLAMY 2,742,952

MOVABLE SEAT

Filed May 12, 1953

3 Sheets-Sheet 3

INVENTOR
CLYDE H. BELLAMY

By [signature]
ATTORNEY

United States Patent Office 2,742,952
Patented Apr. 24, 1956

2,742,952
MOVABLE SEAT

Clyde Hampson Bellamy, Richmond, Va.

Application May 12, 1953, Serial No. 354,495

3 Claims. (Cl. 155—14)

This invention relates to movable seats, and more particularly to the various types of seats used in connection with vehicles, and especially motor vehicles.

At the present time, for example, the automobile has the driver's seat adjustable so that it may be moved toward or from the steering wheel. This type of adjustable seat is mainly provided for operators whose leg lengths vary. For instance, a driver with long legs would desire the seat moved away from the steering wheel so that his feet would be in a better operative relation with respect to the brake pedal and other foot control devices; whereas a driver with short legs would naturally desire the seat closer to such pedals in order to reach them in suitable fashion.

However, in addition to the aforesaid back and forward seat adjustment certain avocations require the driver to move from one side of an automobile to the other side. For instance, in the rural mail delivery art the driver, as a general rule, delivers the mail to receptacles usually on the opposite side of the driver's operating position. The driver, at present, moves across the seat to the opposite side of his automobile, deposits the mail in a receptacle and then moves back to the driving position. It will readily be seen that such method is not only laborious but tends to wear, not only the seat covering, but also the driver's clothes, especially when the delivery is heavy, as it usually is, and over any effective period.

In order to overcome this cumbersome method of delivery one of the objects of this invention is the provision of a movable driver's seat adapted to be actuated from side to side in an automobile.

Another object of this invention is the provision of a seat mounted upon a movable frame.

A further object is the provision of a movable seat adapted to be actuated from side to side of a vehicle, and secured at a predetermined point in said vehicle.

A still further object is the provision of a seat secured to a frame movable upon a companion frame adapted to accommodate another seat.

Figure 1:
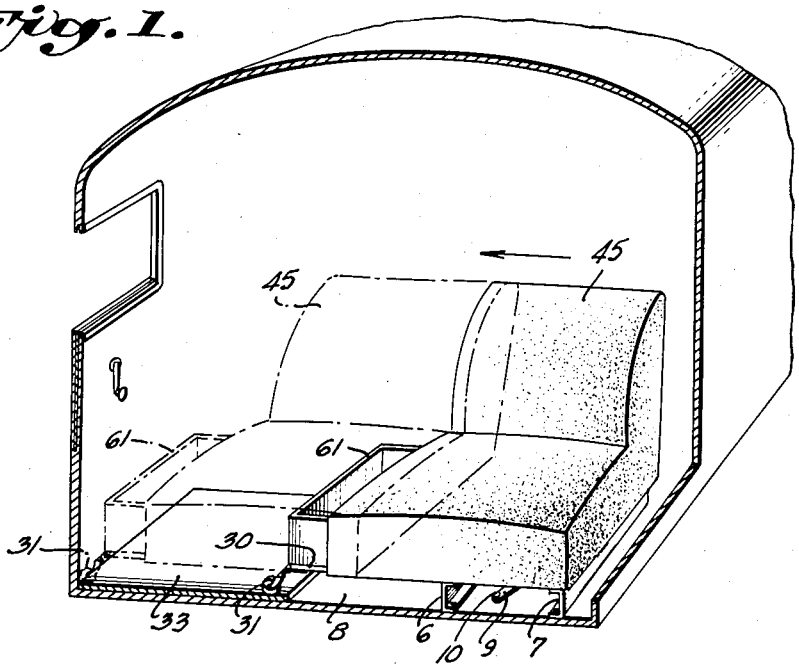
Figure 2:
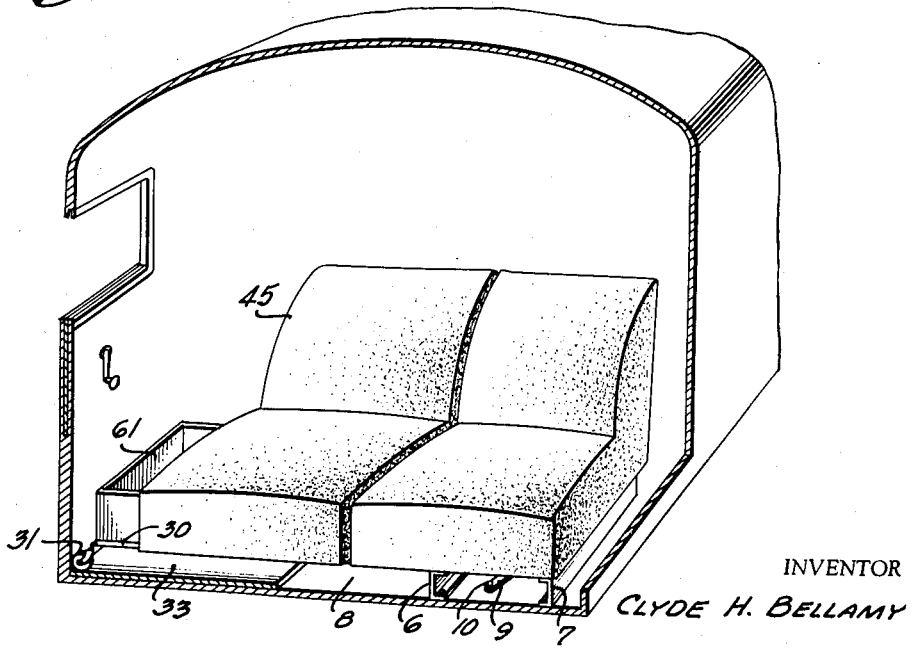
Figure 4:
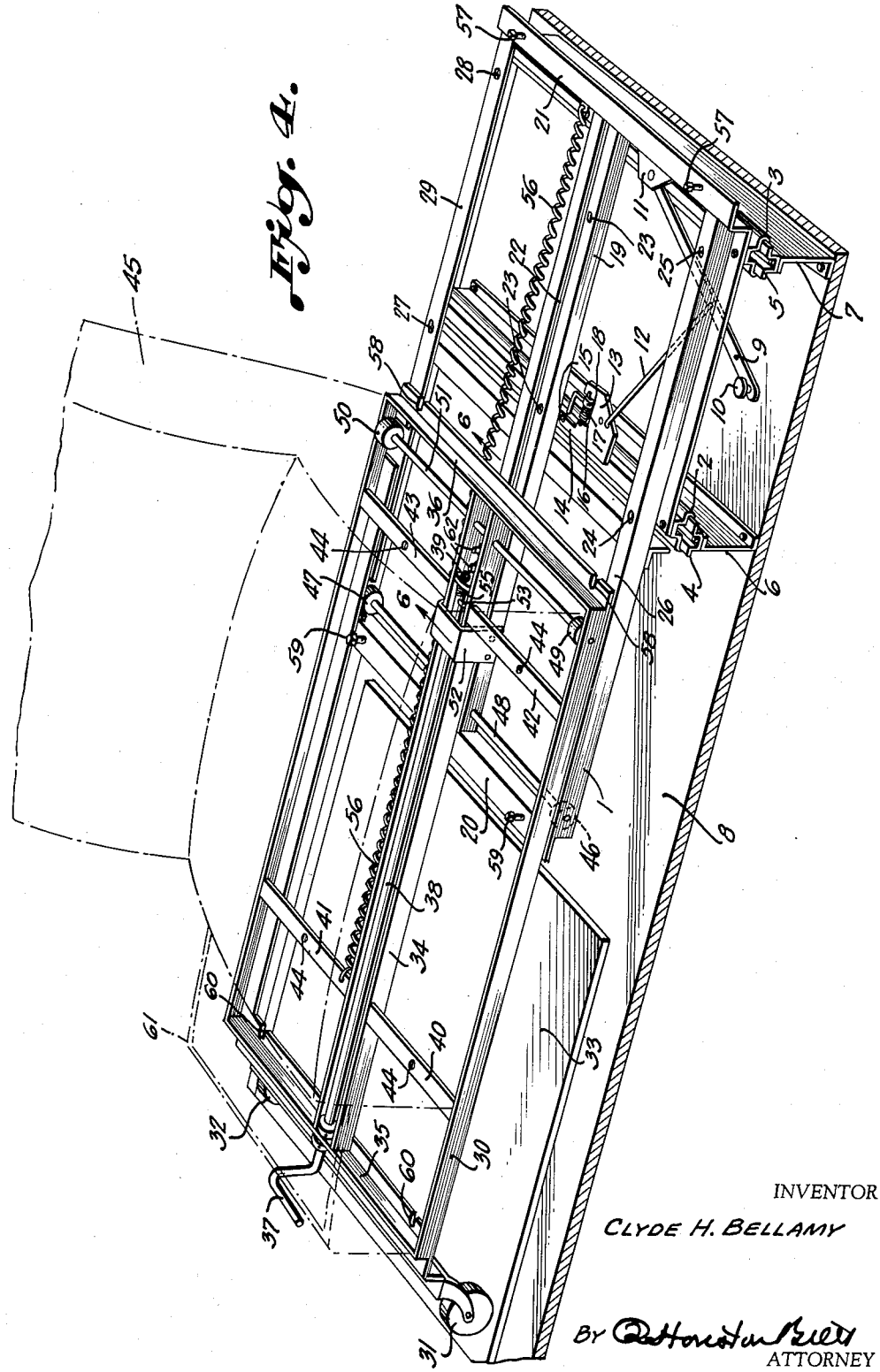

Other objects and features will more fully appear from the following description and accompanying drawings in which:

Fig. 1 is a perspective showing a seat disposed in a vehicle;

Fig. 2 a perspective showing normal seats in a vehicle;

Fig. 3 a sectional exploded view of seat and its connections;

Fig. 4 a perspective of the device;

Fig. 5 a vertical sectional view of latching means on the device;

Fig. 6 a sectional view looking in direction of arrows 6—6 of Fig. 4;

Fig. 7 a sectional view along lines 7—7 of Fig. 6, and

Fig. 8 a sectional view along lines 8—8 of Fig. 6.

Referring more particularly to the drawings, a lower or basal frame 1 is secured to casings 2—3 that are respectively mounted, in slidable fashion, upon tracks 4—5 secured to angular supports 6—7 fastened to a floor 8 of a vehicle. It is thought obvious from the foregoing that by such structure the frame 1 (Fig. 4) may be moved backward and forward upon said tracks. A lever or arm 9 has connected to one of its ends a handle 10 and the other of its ends is pivotally connected to a support 11 secured to the outer end of frame 1. A link 12 (Fig. 5) has one of its ends pivotally connected to arm 9 and the other of its ends likewise connecting a head 13 of a latch 14 mounted in pivotal fashion upon casing 2 at pivot point 15. The head of the latch is provided with a recess 16 and a spring 17 has one of its ends connected to one side of said recess and the other of its ends to the other side of the recess. The latter end of said spring passes through a stop 18 secured to track 2. It is thought obvious that when lever 9 is moved toward casing 3 the spring 17 is depressed against stop 18 and when the former is released said spring moves the latch away from casing 3.

Track 4 has on one of its edges a series of teeth or notches adapted to engage a stop connected to the under side of the latch head; said stop works through an aperture in the U-shaped ridge edge of each casing and normally engages a notch or tooth to secure frame 1 against lateral displacement unless it is moved out of the path of said teeth by actuating lever 9 toward casing 3, as aforesaid. All of the foregoing being clearly illustrated in Fig. 5, and which is well known in the art.

A guide 19 is secured in medial fashion to ends 20—21 of frame 1 as clearly shown in Fig. 4, and has a slot 22 extending throughout the top portion thereof. The guide 19 is provided with a plurality of apertures 23 adapted for locking or securement purposes hereinafter more fully explained. Orifices 24—25 are in the top of a side 26 of frame 1, while holes 27—28 are in the top of a side 29 of said frame; the purposes of which will be more fully explained hereinafter.

A top or upper frame 30 has mounted on its free end wheels 31—32 that ride upon a platform 33 (secured to base 8) when they engage one another, and said platform thereby provides firm supporting means for frame 30. A channel member 34 has one of its ends secured to an end 35 of frame 30 and the other of its ends to the other end 36 of said frame. A handle 37 has extending therefrom a rod 38 disposed in said channel and supported in end 35, in movable fashion, and its free end is journalled in a bearing 39 secured in and to said channel. Braces 40—41; 42—43 are respectively secured to the sides of the frame 30 and channel 34, and each brace has a hole 44 therein to which a seat 45 may be secured in the usual mechanical manner.

A pair of rollers 46—47 are mounted upon an axle 48 secured to the sides of frame 1, and they respectively ride upon the lower portion of frame 30 as clearly shown in Fig. 4. A similar pair of rollers 49—50 are disposed upon an axle 51 and respectively work or extend through recesses in the sides of frame 30, and ride upon the upper or top part of frame 1. It is thought obvious that frame 30 is secured against circumferential displacement with respect to frame 1 by said rollers. A stop 52 extends about channel 34 and is secured to frame 1 so that when frame 30 is extended to a certain position said stop engages braces 42—43; thereby preventing further lateral movement and also circumferential displacement with respect to said frames.

Rod 38 (Fig. 6) near its journalled end has a dog or lug 53 secured thereto and projecting therefrom through an aperture 54 in the base of said channel and said dog is held against the top of guide 19 by a spring 55 secured to said rod and bearing 39, and is adapted to engage any of apertures 23 to secure frame 30 from lateral displacement with respect to frame 1. When handle 37 is raised the dog or lug 53, if in any of the apertures 23, is withdrawn therefrom so as to permit movement of frame 30. A spring 56 has one of its ends secured to brace 41, and its other end fastened to end 21 of frame 1 so that said spring tends to forcibly maintain frame 30 over frame 1 until frame 30 is moved against the spring's tension.

Anchors or bolts 57 on end 21 of frame 1 are respectively adapted to engage notches or slots 58 in the end of frame 30, while anchors or bolts 59 on end 20 of frame 1 are likewise adapted to engage notches or slots 60 on end 35 of frame 30, thereby providing additional securement against circumferential and lateral displacement with respect to frames 1 and 30. A receptacle or mailbox 61 may be placed between handle 37 and seat 45. Guide bolts 62 (Fig. 6) are secured to the base of channel 34 and extend into slot 22 thereby maintaining frame 30 in alignment with frame 1.

The device functions as follows: When the movable seat is desired to be used for delivery purposes the driver of a vehicle, of course, is disposed upon the seat under the driver's wheel and lug 53 is positioned in aperture 23 next to end 21 of frame 1. This seating position is for the normal driving of a motor vehicle. When the driver desires to deliver a letter or an article from the opposite side of the vehicle he raises handle 37 thereby causing the lug to disengage, and he then manually moves frame 30 toward the opposite side and then releases handle 37 so the lug will find its proper aperture 23. After delivering the article the driver again raises handle 37 and spring 56 causes frame 30 to move over frame 1 until it is in a driver position when it is locked as aforesaid. If the seat is desired to be locked in the center of the vehicle this may be done by causing the lug to engage the proper aperture 23.

When the movable seat is not in use it is extended and locked and if desired another seat may be bolted or secured to frame 1 (see Fig. 3) in any suitable manner, and the vehicle is thereby provided with the conventional front seats.

It is to be understood that the movable seat may be actuated by a motor or other suitable non-manual means within the scope of this invention and the range of mechanical equivalents.

Having described this invention, what is claimed is:

1. In a device of the character described the combination with a vehicle having a floor, a pair of longitudinally extending trackways, guide means movable on said trackways, a lower frame on said guide means, a laterally movable frame having a seat secured thereto and having rollers therein engaging the lower frame, a platform spaced from the floor, rollers on said laterally movable frame engaging said platform, said upper frame carrying the seat being movable from a driver position to another position laterally spaced therefrom.

2. The structure of claim 1 wherein the lower frame is provided with latch engaging means and there is provided a lever operated latch on the upper frame holding same in adjusted position.

3. The structure of claim 1 in which rollers are mounted on said lower frame engaging the upper frame intermediate its ends.

References Cited in the file of this patent

UNITED STATES PATENTS

| | | |
|---|---|---|
| 625,690 | Kinsey | May 23, 1899 |
| 1,643,236 | Bell | Sept. 20, 1927 |
| 1,728,655 | Beutner | Sept. 17, 1929 |
| 2,066,557 | Cox | Jan. 5, 1937 |
| 2,324,207 | Gsell | July 13, 1943 |
| 2,545,813 | Jackson | Mar. 20, 1951 |
| 2,615,493 | Hunter | Oct. 28, 1952 |

FOREIGN PATENTS

| | | |
|---|---|---|
| 5,960 | Great Britain | 1897 |
| 333,354 | Great Britain | Aug. 14, 1930 |